US 6,724,880 B1

(12) United States Patent
Lynch

(10) Patent No.: US 6,724,880 B1
(45) Date of Patent: Apr. 20, 2004

(54) METHOD AND APPARATUS FOR SPARING COMMUNICATIONS CIRCUITS

(75) Inventor: Franklin A. Lynch, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 694 days.

(21) Appl. No.: 09/637,744

(22) Filed: Aug. 11, 2000

(51) Int. Cl.[7] .............................................. H04L 12/50
(52) U.S. Cl. ..................... 379/219; 340/825.01; 398/98
(58) Field of Search ........................... 379/219, 221.01, 379/221.03, 221.04, 221.06, 273, 279; 340/825.01; 398/98

(56) References Cited

U.S. PATENT DOCUMENTS

| | | | | |
|---|---|---|---|---|
| 5,321,394 A | * | 6/1994 | Carlton et al. | 340/825.01 |
| 5,335,105 A | * | 8/1994 | Carlton | 359/135 |
| 5,638,358 A | * | 6/1997 | Hagi | 370/228 |
| 5,859,895 A | * | 1/1999 | Pomp et al. | 379/221 |
| 5,901,024 A | * | 5/1999 | Deschaine et al. | 370/228 |
| 6,278,778 B1 | * | 8/2001 | Abdollahi et al. | 379/373 |
| 6,449,249 B1 | * | 9/2002 | Cloonan et al. | 370/217 |

* cited by examiner

Primary Examiner—William J. Deane, Jr.

(74) Attorney, Agent, or Firm—Withrow & Terranova, PLLC

(57) ABSTRACT

Splitting circuitry receives external telecommunications lines and splits them into corresponding primary and secondary lines for implementing an N:1 sparing arrangement in an associated telecommunications system. Sparing circuitry receives the secondary lines and includes selection circuitry and a sparing bus, where the selection circuitry selectively connects a desired group of secondary lines to the sparing bus in response to a selection control signal. Preferably, the telecommunications system routes communications traffic between subscriber equipment connected via the external telecommunications lines and a larger communications network using N primary line interfaces coupled with the primary lines. When desired, the telecommunications system controls the sparing circuitry such that secondary lines corresponding to a group of primary lines associated with a given primary line interface connect to the spare line interface. Thus, communications traffic that would otherwise be routed through the given primary line interface is routed through the spare line interface. Because sparing functions associated with the secondary signals do not interfere with primary signals, maintenance and service operations may be performed on elements of the sparing circuitry without interrupting data traffic being carried on the primary lines. This is particularly advantageous for telecommunications systems having primary line interfaces that support a large number of telecommunication lines, where removing even a single primary line interface from service for sparing equipment maintenance is unacceptable.

28 Claims, 10 Drawing Sheets

METHOD AND APPARATUS FOR SPARING COMMUNICATIONS CIRCUITS

FIELD OF THE INVENTION

The present invention relates to using backup or spare communications circuitry in a communications system as needed, and particularly relates to using separate communications signal paths in circuit sparing operations.

BACKGROUND OF THE INVENTION

Modern telecommunication systems are extraordinarily complicated, and yet they are oftentimes taken for granted by the consumers who use them. This tendency for people to under appreciate their underlying complexity is perhaps the greatest testament to the reliability of modern telecommunication systems. Achieving this level of reliability in a complex network of interconnected equipment requires substantial effort, ingenuity, and a strong belief in contingency planning.

Failure at some point is inevitable for all electronic circuits. One may assume that any electronic circuit is subject to failure at some time. This basic assumption finds its fullest refinement in the art of reliability engineering, where complex prediction techniques allow engineers to estimate values for parameters such as mean-time-to-failure (MTTF) for various circuits and systems. While the use of reliable components and careful engineering results in telecommunication circuits with low rates of failure, the possibility of failure is inescapable. Some telecommunication circuits are simply too critical to leave this possibility of failure unmitigated. In such cases, it is common to provide spare or backup communication circuits that are used to substitute for primary circuits as needed.

In 1:1 sparing schemes, each critical primary circuit has a corresponding spare circuit. However because of constraints on equipment size and cost, 1:1 sparing is reserved for the most critical circuits. As an alternative, a piece of telecommunications equipment may include a single spare circuit that may be substituted for any one of a number of primary communication circuits. The sparing of this type is referred to as N:1 sparing. A common problem with existing sparing techniques is that the communication signal paths running through the primary circuits are also routed through the sparing circuits. For example, switches or their electronic equivalents are commonly used to connect communication lines to either primary communications circuits or to a spare communications circuit. While this does allow switching between primary and backup communications circuits as needed, it makes the primary communications signal paths directly dependent upon the switches themselves. Thus, switch failures or switch maintenance activities undesirably disrupt communication signals from the primary communications circuits.

Conventional sparing techniques are particularly problematic in telecommunications line interface equipment. In a high-density system, the telecommunications line interface equipment uses a number of line cards to interface a large number of telecommunication lines with associated transmission or network equipment. Each line card carries interface circuits for a substantial number of telecommunication lines. Because of the large number of telecommunication lines serviced by any one line card, removing even a single line card from service would result in a loss of service to a greater number of customers than controlling telecommunications standards allow. With conventional sparing techniques applied to an N:1 arrangement, each of the telecommunication lines is routed through some type of switching circuitry that selectively switches the telecommunication lines from any primary line card to a spare line card. While this solves the problem of providing a spare line card when needed, it also means that any problems or maintenance associated with the switching circuitry can remove at least as many telecommunication lines from service as would the failure of one of the primary line cards.

Accordingly, there remains a need for a telecommunications line interface architecture that includes sparing circuitry that may be used as a backup to one or more primary communication circuits, without failures or maintenance of the sparing circuitry compromising the availability of the primary communication circuits.

SUMMARY OF THE INVENTION

The present invention splits telecommunication lines, such as DS1 subscriber lines, into primary and secondary signal paths within a piece of telecommunications line interface equipment. The primary signal paths connect the telecommunication lines to primary interface circuits, while the secondary signal paths are used to selectively connect desired ones of the telecommunication lines to spare interface circuits as needed. Preferably, the present invention includes a switching network that operates only on the secondary signal paths to connect selected ones of the telecommunication lines to the spare interface circuits. As such, the telecommunication lines remain connected to the primary line interfaces through the primary signal paths, which are independent of the switched secondary signal paths used with the spare line interface circuits. This allows maintenance to be performed on the switching network or on the spare line interface circuits without disrupting services on any of the telecommunication lines supported by the primary interface circuits.

Preferably, the present invention includes circuitry for splitting incoming telecommunication lines into corresponding primary and secondary lines, and operating on the secondary lines to implement sparing functions. The primary lines couple directly to the primary line interfaces through the primary signal paths and are not routed through the sparing circuitry operating on the secondary lines. The sparing circuitry may include sparing switches (switching network) and associated control circuitry for selectively connecting desired ones of the secondary signal paths to a spare line interface. Preferably, the sparing circuitry is configured as a backplane, sparing switch cards, and a sparing switch control card. The backplane connects a group of secondary signals to each sparing switch card, and each sparing switch card includes switched connections for selectively connecting its associated group of secondary signals to a sparing bus carried on the backplane. A sparing bus interface on the backplane allows connection of the sparing bus with the spare line interface. When a given primary line interface fails or requires maintenance, the telecommunications line interface equipment uses the sparing circuitry of the present invention to connect the group of secondary lines corresponding to the primary lines associated with the given primary line interface to the spare line interface by controlling the appropriate switches on the sparing switch cards.

Typical telecommunications line interface equipment organizes line interface circuitry into one or more line cards. In high-density systems, a single line card may interface with a substantial number of telecommunications lines. Telecommunication standards dictate a maximum number of such lines that may be out of service at any one time due to maintenance activities or circuit failure. Thus, even the loss of one such line card may represent an unacceptable loss of service. The present invention may be advantageously used in such a system to provide sparing functions for any one of the primary line cards using a single backup line card. Unlike conventional approaches to sparing critical telecommunication circuits, the present invention does not use a common signal path for both sparing functions and primary communications. With a common signal path, failures or maintenance of sparing-related circuits disrupts primary communications, which is unacceptable in the high-density systems described above. The split secondary and primary signal paths provided by the present invention allow sparing functions to use secondary signal paths that do not interfere with primary communications. Other aspects and features of the present invention will become apparent to those ordinarily skilled in the art upon review of the following description of exemplary embodiments of the invention in conjunction with the accompanying figures.

DETAILED DESCRIPTION OF THE INVENTION

Figure 1:
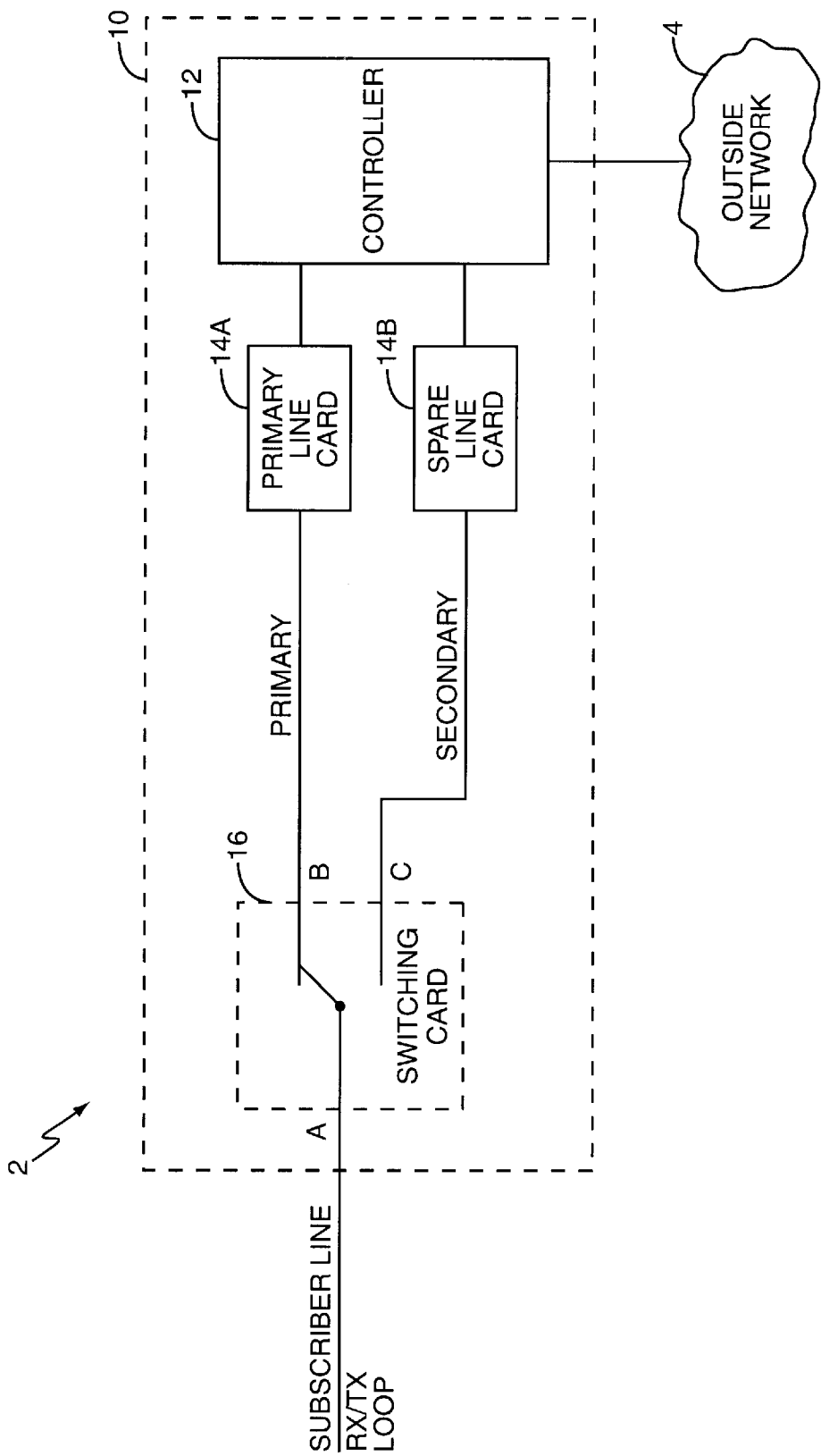
FIG. 1 illustrates an existing approach to providing spare circuitry in a telecommunications line interface environment.

FIG. 1 illustrates a conventional approach to providing spare circuitry in a typical telecommunications environment 2. Telecommunications line interface equipment 10 includes a switch 16 (or equivalent electronics), a switched primary signal path selectively connected to a primary line card 14A, a switched secondary signal path selectively connected to a spare line card 14B, and a controller 12. In operation, the equipment 10 connects the telecommunications line (subscriber line) with either the primary line card 14A or the spare line card 14B, as desired or needed. Using either the primary or spare line cards 14, the equipment 10 transfers communications signals between subscriber equipment connected to a remote end of the telecommunication line and a network 4, which may, for example, be transmission equipment. As illustrated, the equipment 10 switches a single subscriber line between the primary line card 14A and the spare line card 14B, but it should be understood that many subscriber lines might be switched in similar fashion between a plurality of primary line cards 14A and the spare line card 14B.

Figure 2:
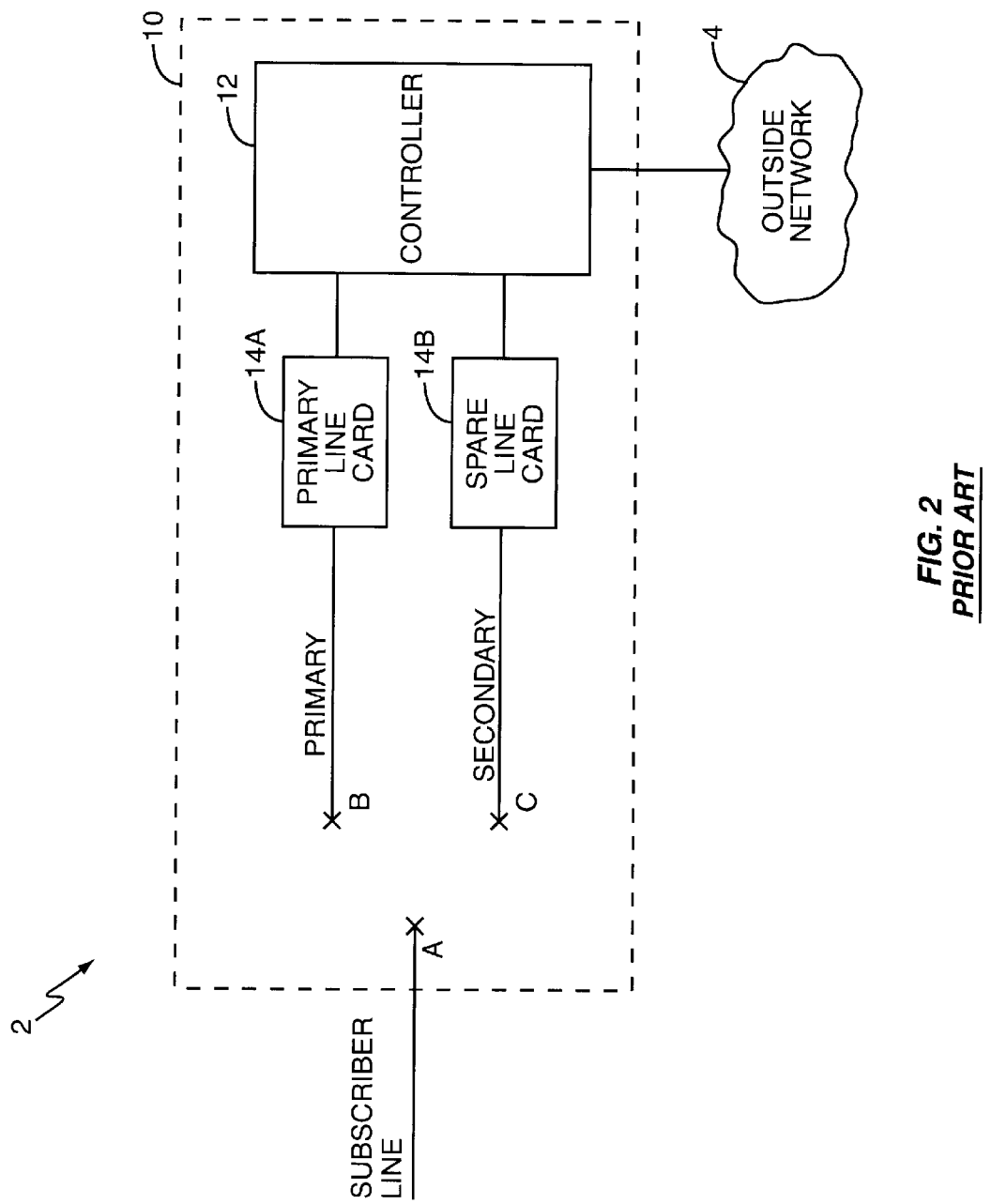
FIG. 2 further illustrates problems associated with the existing sparing approach of FIG. 1.

In normal operation, the equipment 10 routes communications traffic to and from the subscriber line through switch 16 using the primary line card 14A. Upon detecting a failure (or for maintenance of the primary line card), the controller 12 causes switch 16 to connect the subscriber line to the spare line card 14B. FIG. 2 depicts switch 16 removed and illustrates a fundamental problem with this conventional approach to providing spare communications circuitry. Assume that instead of a problem with the primary line card 14A, there is instead a failure of the switch 16 (or associated switch 16 electronics). As shown, when switch 16 is faulty or otherwise removed from service, both the primary and secondary signal paths are disrupted, leaving the controller 12 unable to route communications signals through either the primary line card 14A or the spare line card 14B.

In a more complex illustration, the switch 16 would be shown as a group of switches or equivalent electronic circuitry adapted to switch a large number of telecommunication lines into corresponding primary line cards 14A, or switch a selected group of these telecommunication lines into the spare line card 14B. Because the switch 16 really serves no other purpose than to enable the use of the spare line card 14B when desired, it is undesirable that failures or maintenance activities associated with switch 16 should disrupt normal communications using the primary line card 14A.

Telecommunications standards, such as GR-512-Core, LSSGR Reliability, Section 12 (Issue 2, January 1998), set strict limits on permissible service outages. For example, a reportable Partial Outage is defined as an event including a loss of origination or termination capability in more than 64 terminations (e.g., telecommunication line interfaces) for fewer than all terminations on the switch (line interface) for greater than 30 seconds, or the loss of access to one or more services (e.g., 911, voicemail services, operator services) because of failure conditions in the line interface that affect more than 64 terminations for greater than 30 seconds. The requirement for Multitermination Downtime is set at 1.2 minutes/year or less, where Multitermination Downtime is the expected long-term average annual time spent in failure modes (due to hardware failures, operations, administration, and maintenance activities). This is a generic requirement for telecommunications switching in transmission equipment that dictates maximum hardware failures and interruptions. In light of these requirements, it is impractical to apply conventional sparing techniques in high-density telecommunication line interface equipment, because of the number of telecommunication circuits that are taken out of service due to failures or maintenance of the conventional sparing circuitry.

Figure 3:
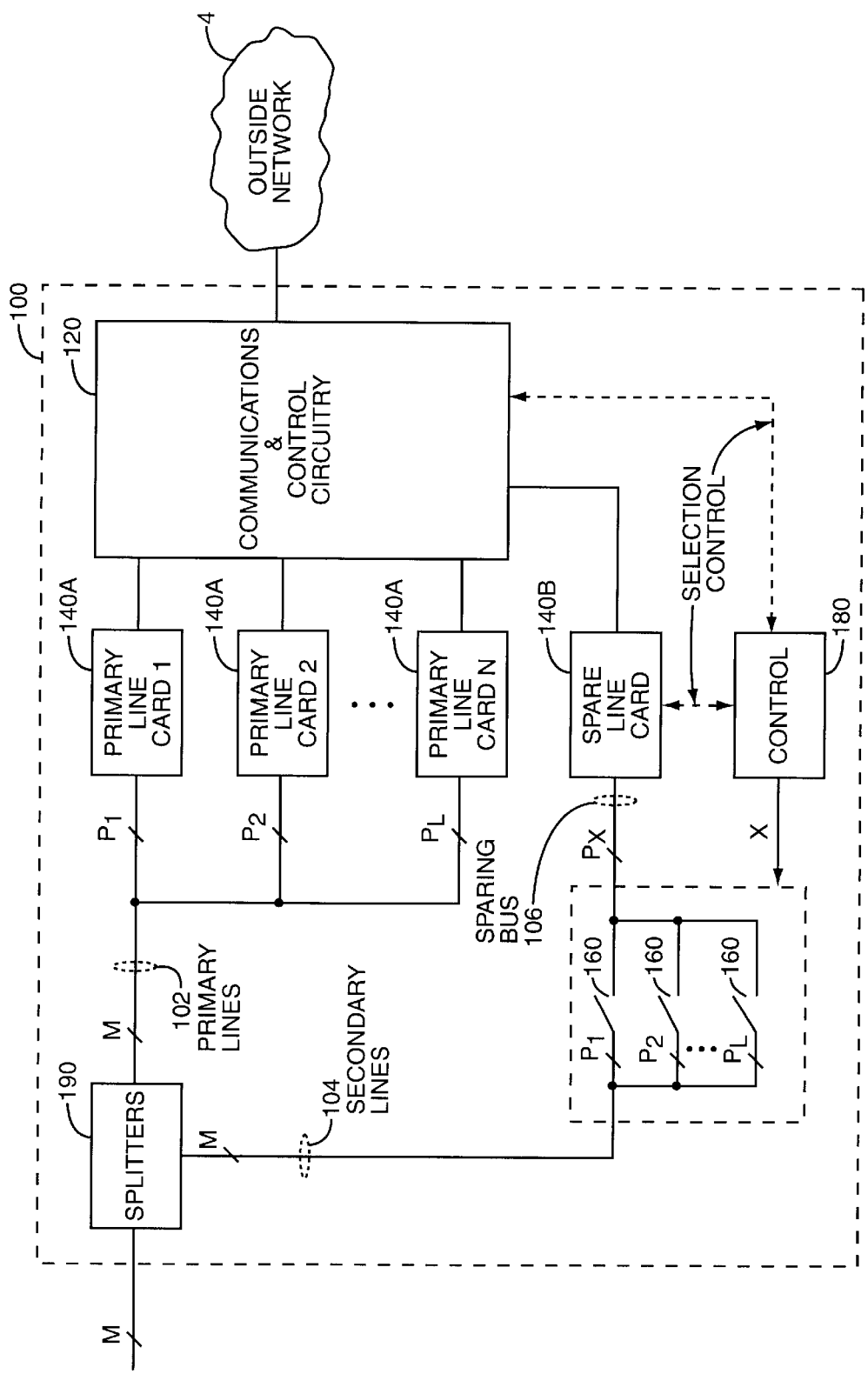
FIG. 3 illustrates an exemplary embodiment for the sparing technique of the present invention.

FIG. 3 illustrates an exemplary embodiment of the present invention included in telecommunications line interface equipment 100. As illustrated, the equipment 100 includes communications and control circuitry 120 for handling communications signal routing and system-level operations, primary lines cards 140A, and a spare line card 140B. The equipment 100 further includes splitting circuitry 190, switches 160, selection control circuitry 180, and a sparing bus 106. The splitting circuitry 190 splits the connected telecommunication lines into corresponding primary lines 102 and secondary lines 104.

Note that the primary lines 102 couple to primary line cards 140A without passing through the sparing switches 160. This allows communications traffic to pass through the primary signal lines 102 independent of whether circuitry associated with sparing operations and secondary lines 104 is installed or functional. The sparing switches 160, which operate under control of selection control circuitry 180, selectively connect desired ones of the secondary lines 104 with a sparing bus 106. In turn, the sparing bus connects with a spare line interface card 140B.

In one embodiment, the switches 160 (including associated switch drive circuitry not illustrated for simplicity), the sparing bus 106, and the selection control circuitry 180 cooperate to form sparing circuitry. Such sparing circuitry allows the communications and control circuitry 120 to route the communications traffic normally handled by any one of the primary line cards 140A through the spare line card 140B as needed.

In more detail, the splitter circuitry 190 splits a number of external telecommunication lines into corresponding numbers of primary lines 102 and secondary lines 104. The primary lines 102 couple to a plurality of primary line cards 140A, with each primary line card 14A0 receiving a different group of primary lines 102 corresponding to a number of the external telecommunication lines. The secondary lines 104 are coupled to selection circuitry, shown here in simplified form as a collection of switches 160.

Primary lines 102 are preferably organized into equal numbered groups ($P_1$, $P_2$, ..., $P_L$), with each group being assigned to a particular primary line card 140A. Similarly, the secondary lines 104 split off from the primary lines 102 are organized into corresponding, like-numbered groups ($P_1$, $P_2$, ..., $P_L$), with each group being connected to a group of switches 160. With this arrangement, the switches 160 are controlled by selection control circuitry 180 to connect a desired group ($P_x$) of secondary lines 104 to the sparing bus 106. In turn, the sparing bus 106 connects with the spare line card 140B.

In operation, the communications controller 120 may cooperate with the selection control circuitry 180 to connect a group of secondary lines 104 to the spare line card 140B through the sparing bus 106, when a given primary line interface card 140A fails. This action provides an alternate connection between the telecommunication lines affected by the failed primary line card 140A and the network 4. Notably, all sparing functions operate on the secondary signal lines 104, allowing the switches 160, the spare line card 140B, and the selection control circuitry 180 to fail or be taken offline for service, without interfering with the telecommunication signals being transferred to and from the telecommunication lines over the primary lines 102 via the primary line cards 140A.

Figure 4:
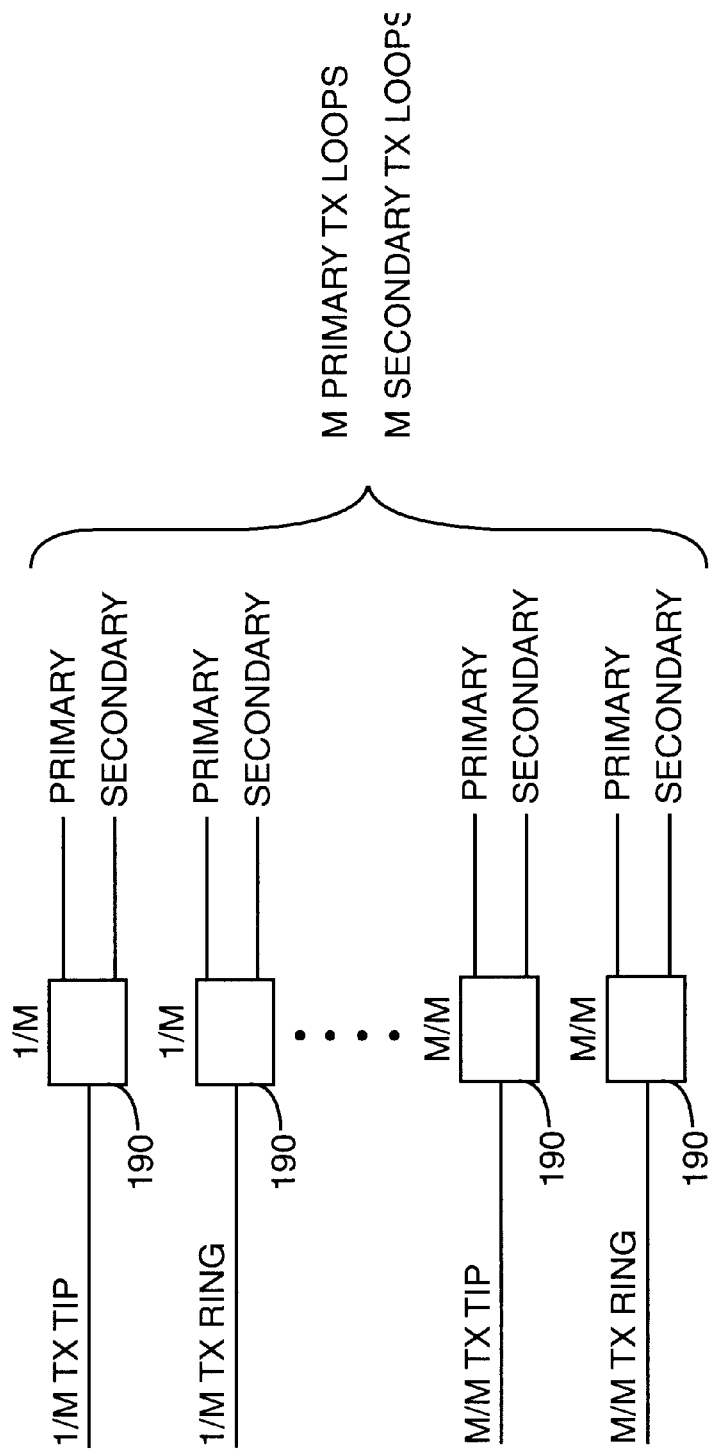
FIG. 4 illustrates exemplary telecommunication line splitting details for the present invention.

FIG. 4 illustrates an exemplary arrangement of the splitter circuitry 190 for use with telecommunication lines comprising typical wire line subscriber loops, such as North American DS1 or European E1 digital subscriber lines. Commonly, each telecommunication line comprises a receive loop and a transmit loop, with each loop comprising a differential conductor pair. These conductor pairs are often implemented as unshielded twisted pairs (UTP). Thus, for any one telecommunications line, the splitter circuitry 190 comprises an individual splitter circuit 190 for each conductor used in the receive and transmit loops (RX and TX).

FIG. 4 illustrates the interface between the transmit conductors for a number M telecommunication lines configured as UTP wire lines. Each conductor in each transmit loop is split into a primary and secondary signal by a splitter circuit 190. While not shown, the associated receive loops would be similarly split into primary and secondary signals. With this configuration, primary line differential RX and TX pairs are coupled to primary line cards 140A and secondary line differential RX and TX pairs are coupled to the switches 160.

Signal characteristics vary widely depending upon the particular type of telecommunication line in use. The present invention may be adapted to interface with a wide range of telecommunication or network line types. When applied to DS1 or E1 lines, the splitter circuits 190 may be advantageously implemented as passive splitting networks.

Figure 5:
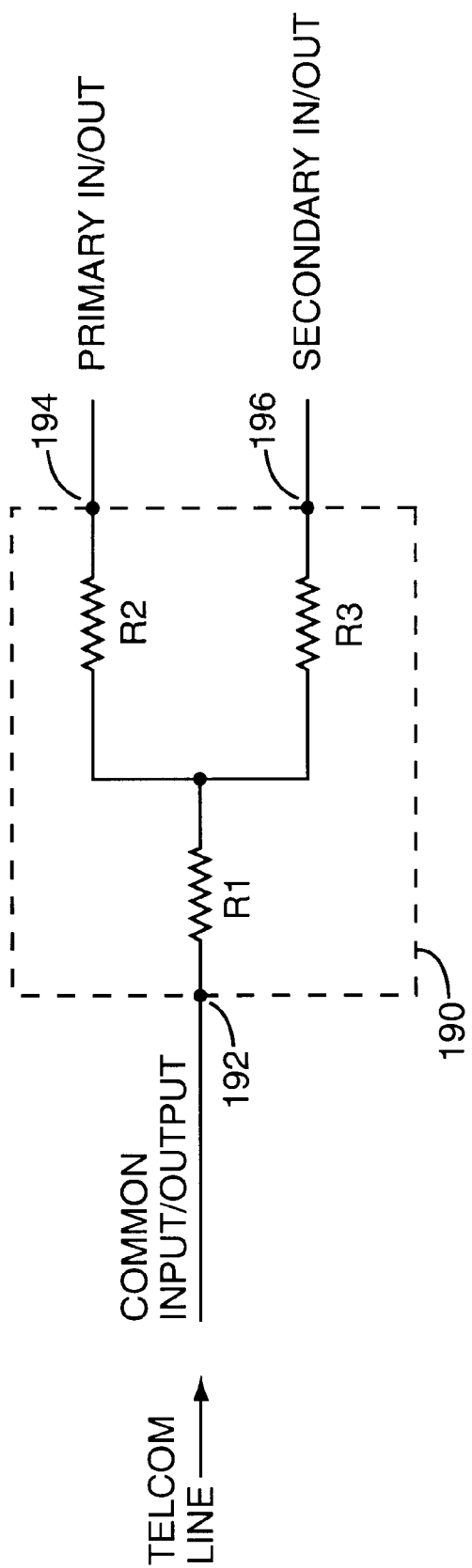
FIG. 5 illustrates an exemplary passive network for performing the line splitting used by the sparing technique of the present invention.

FIG. 5 illustrates an exemplary embodiment of a resistor-based passive splitting network. Note that when referred to as splitter circuitry 190 herein, such circuitry will include splitter circuits for each telecommunication line (or individual conductors comprising such lines.) The splitter network 190 includes a common terminal 192 that is interconnected with a primary terminal 194 and a secondary terminal 196. Circuit arrangements used to interconnect these terminals may be varied as needed for a particular type of telecommunication line.

Those skilled in the art will readily appreciate that the arrangement shown in FIG. 5 represents an advantageous embodiment for splitting certain types of telecommunication lines. Other types of communication lines may favor different splitting circuitry arrangements, which may advantageously incorporate other passive circuit elements, such as capacitors and inductors. Further variations of the splitter circuits 190 may incorporate active elements, such as active buffers or amplifiers to provide signal isolation between primary and secondary lines, or to alleviate loading problems and impedance matching issues associated with the telecommunication lines.

The splitter circuit 190 illustrated in FIG. 5 provides an interface impedance that is designed to be proportional to the expected or nominal line impedance of the telecommunication line circuit. Most DS1 telecommunication lines are configured as balanced conductor pairs ranging from 100 to 130 Ohms. Short, intra-building DS1 runs within a telecommunications system Central Office may use unbalanced, 75-Ohm coax cable. The present invention is readily adaptable to these and other variations. A preferred method of matching the passive splitter network illustrated in the splitter circuit 190 of FIG. 5 for a balanced, symmetrical telecommunication line impedance in an N-way splitting arrangement is given as follows, $$R = \frac{z}{(2(N+1))}$$

Where R=the value of all resistors R1, R2, and R3. Note that a balanced conductor pair (e.g., UTP) will use two such splitter circuits 190, one for each conductor. Thus, the above equation computes R for the six resistors comprising these two splitter circuits 190. Further, z=the telecommunication line design impedance, N=the desired number of splits, which is "2" for a primary and secondary line split. Thus, for a telecommunication line impedance of 100 Ohms and a two-way split, $$R = \frac{100}{(2(2+1))} = \frac{100}{6} = 16\frac{2}{3} \Omega,$$

In manufacturing, the closest available standard resistor value is chosen. For the above configuration, a value of 17.8 Ohms may be chosen. This value represents only a 6.8% error from the calculated resistance value and provides for approximately 30 dB of return loss on the telecommunication line. This represents approximately a 10 dB margin above a desired minimum 20 dB return loss value.

Figure 6:
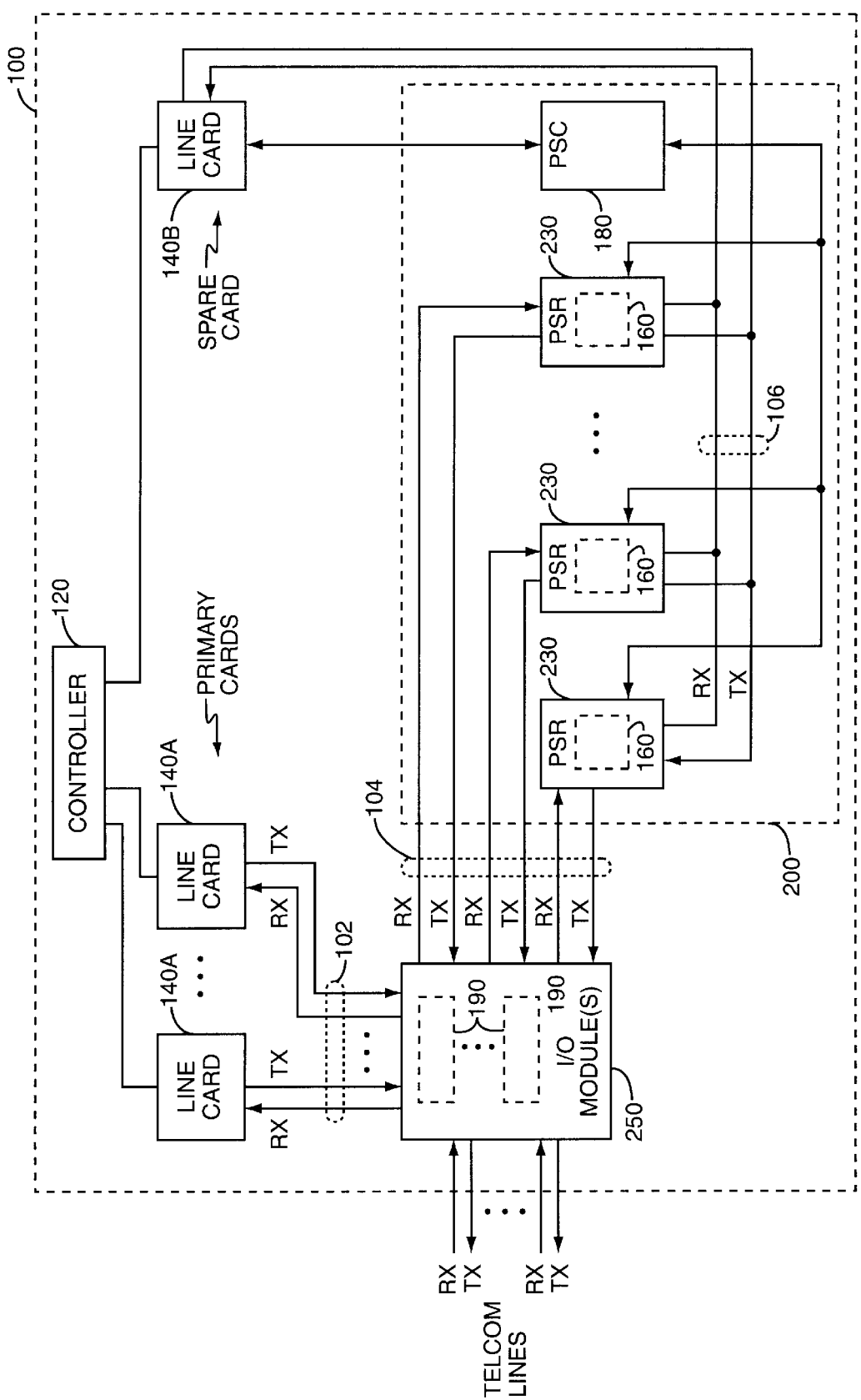
FIG. 6 illustrates an exemplary architecture for the sparing functions of the present invention as applied to a type of telecommunications line interface equipment.

FIG. 6 presents an exemplary arrangement for the telecommunications line interface equipment 100 introduced in FIG. 3. Preferably, the equipment 100 is arranged as a rack system, with its contained circuitry arranged on a series of cards and backplanes organized by associated functionality. With this in mind, the controller 120 may comprise a plurality of associated communications controllers arranged on a number of circuit cards that, collectively, control the communications signal routing between the network 4 and the connected telecommunication lines. A number of I/O module cards 250 provide physical interfaces for the plurality of telecommunication lines connected to the telecommunication line interface equipment 100. In an exemplary rack system arrangement for the telecommunication line equipment 100, each I/O card 250 connects with up to 32 external telecommunication lines comprising RX and TX loop pairs. Thus, each I/O card 250 includes a corresponding number of splitter circuits 190 adapted to split the receive and transmit pairs (RX/TX) of each telecommunication line into corresponding primary and secondary TX and RX line pairs. Exemplary primary line cards 140A are each adapted to receive primary RX and TX lines split from 16 of the external telecommunication lines. Thus, in this exemplary arrangement, there are two primary line cards 140A for each I/O card 250. A backplane 200 is adapted to receive secondary RX and TX line pairs split from the external telecommunication lines connected to all of the I/O cards 250. A number of sparing switch cards 230, also referred to as Protection Switch Relay (PSR) cards, are connected to the backplane 200. Preferably, each sparing switch card 230 includes 16 secondary TX line pair switches 160 and 16 secondary RX line pair switches 160, along with associated switch control and interface circuitry. In this arrangement, there is a one-to-one correspondence between the sparing switch cards 230 and the primary line cards 140A. That is, each sparing switch card 230 receives a group of secondary TX and RX lines corresponding to a group of primary TX and RX lines attached to one of the primary line cards 140A. The backplane 200 also carries a switch selection control card 180 that is adapted to control the sparing switch cards 230, such that selected groups of secondary TX and RX lines may be connected to the sparing bus 106.

Figure 7:
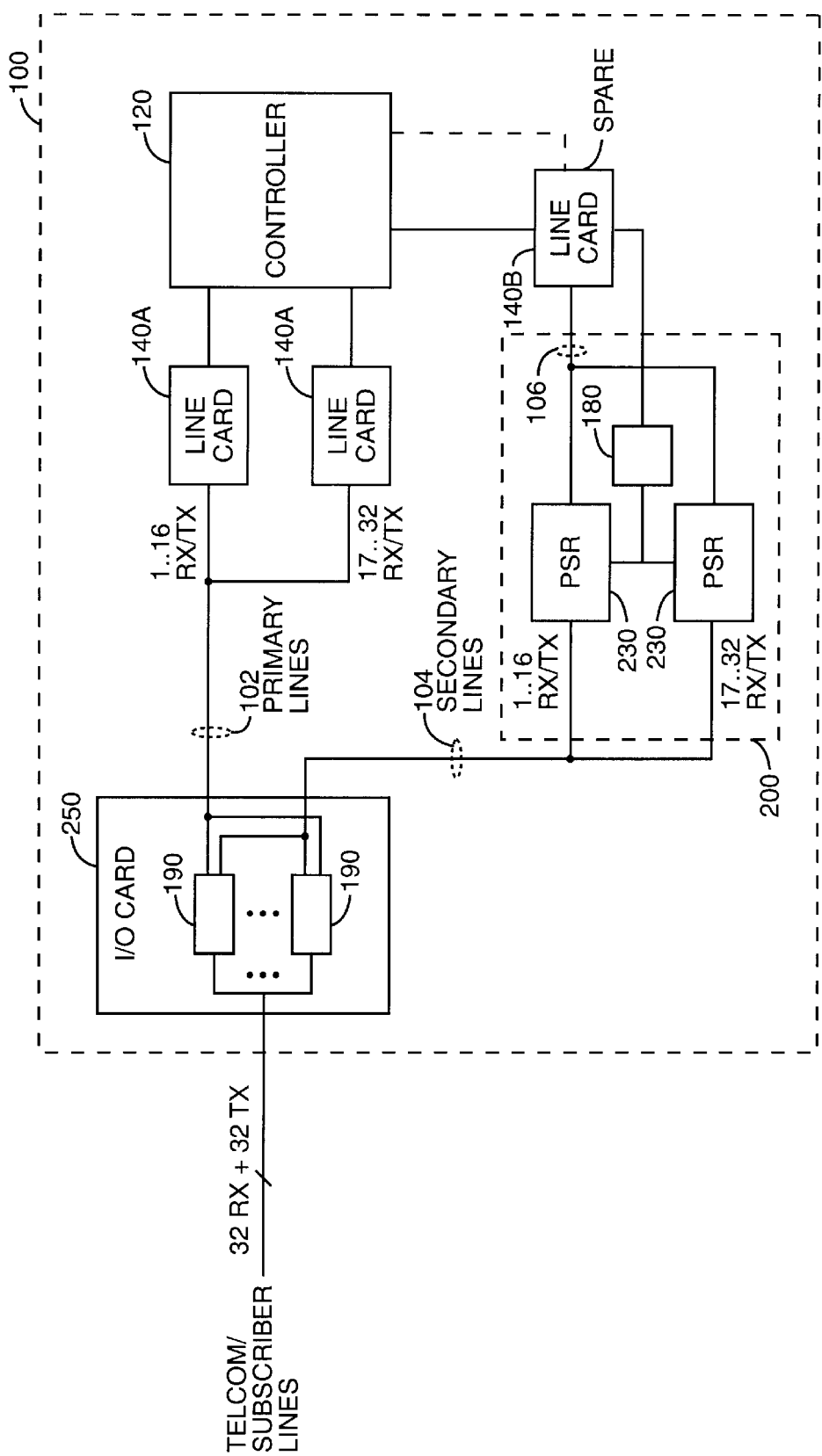
FIG. 7 illustrates exemplary card architecture for implementing the sparing circuitry of the present invention.

FIG. 7 illustrates a basic complement of circuit cards in this exemplary architecture. A basic card arrangement includes one I/O card 250, two primary line cards 140A, a spare line card 140B, a sparing backplane 200, two sparing switch cards 230, one switch selection control card 180, and a number of controller cards comprising the communications controller 120. Each I/O card 250 interfaces with up to 32 telecommunications lines and includes splitter circuitry 190 splitting these lines into corresponding primary and secondary lines 102 and 104, respectively. Each I/O card 250 provides 16 primary RX and TX lines 102 to each of the two primary line cards 140A and provides 16 corresponding secondary RX and TX lines 104 to the backplane 200. The backplane 200 routes these secondary lines 104 to two sparing switch cards 230 in groups corresponding to the manner in which the primary lines 102 are grouped for connection to the primary line cards 140A.

The switch selection control card 180 provides selection control signals to the two sparing switch cards 230. In an exemplary architecture, the telecommunications line interface equipment 100 accommodates up to four basic card sets, and thus holds four I/O cards 250, eight primary line cards 140A, eight sparing switch cards 230, one switch selection control card 180, and one spare line card 140B. In this configuration, the telecommunications line interface equipment 100 interfaces up to 128 telecommunication lines with the network 4.

This exemplary architecture contemplates a rack system comprising the telecommunications line interface equipment 100 in which the sparing circuitry (e.g., backplane 200, and associated cards and circuitry) is organized on a "sparing shelf" that may be optionally included in the rack system, such that the telecommunications line interface equipment 100 can be configured with or without sparing capability. With this arrangement, the telecommunication lines are coupled to the primary line cards 140A via the primary lines 102 and split off using the splitting circuitry 190. These primary lines 102 are routed independently of the secondary lines 104. Thus, the sparing circuitry 190 may be installed or not installed, without interfering with communication operations through the primary line cards 140A.

Figure 8:
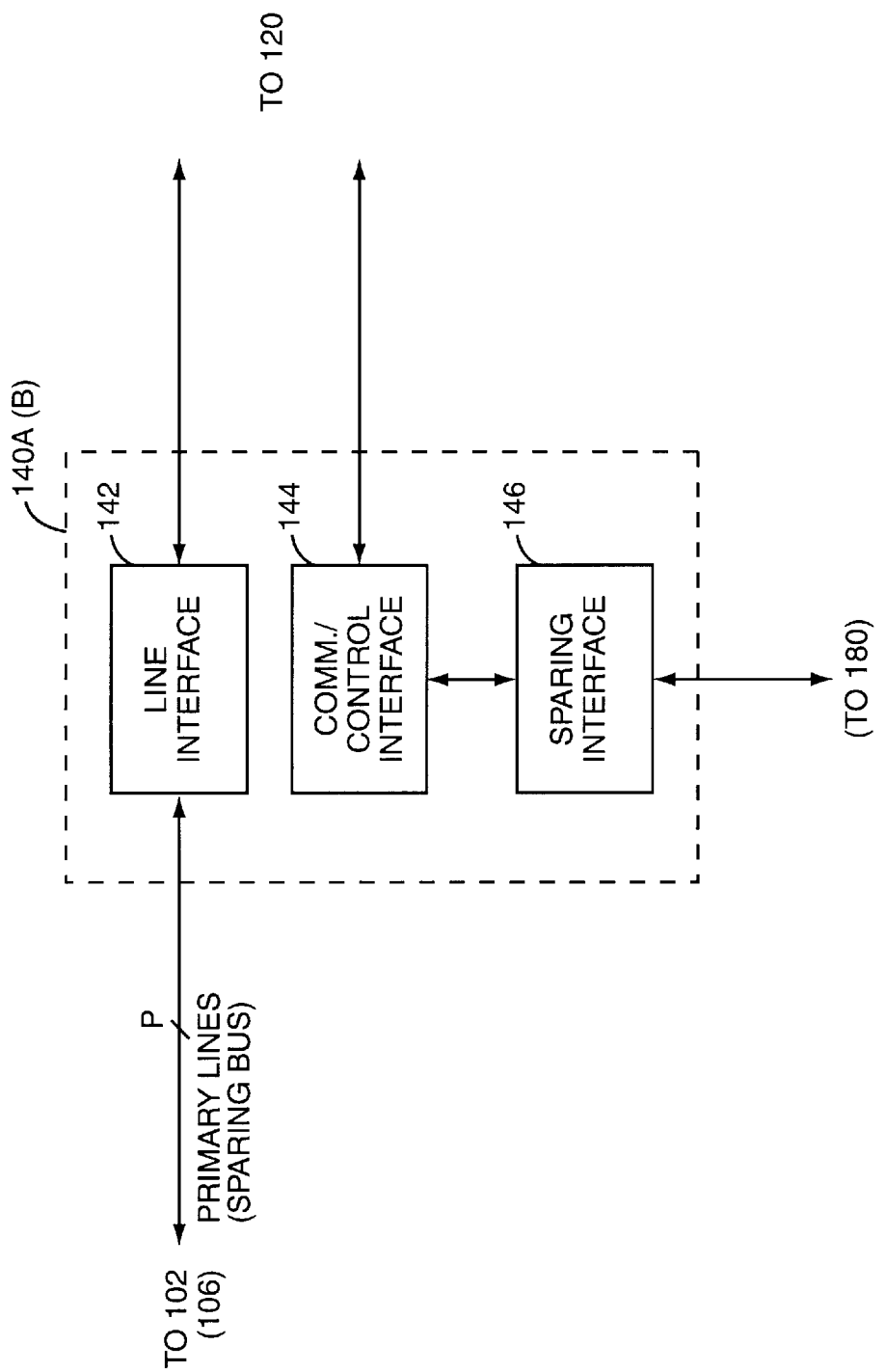
FIG. 8 illustrates an exemplary embodiment for a telecommunications line interface card adapted for the sparing technique of the present invention.

FIG. 8 illustrates an exemplary line card 140, which may be used as either a primary or spare line card, 140A and 140B respectively. Note that other configurations of line card 140 may be implemented as desired. For example, there may be economic advantage in developing a line card 140A for use in primary communications that omits the interface 146 used to communicate with the switch selection control card 180. When used as a spare line card 140B, the line card 140B communicates with the switch selection card 180 via the switch control interface 146 under control of the communications controller 120. This communications link allows the spare line card 140B to direct the switch selection card 180 to control one of the sparing switch cards 230 to connect a desired group of secondary lines 104 through the sparing bus 106.

The line card 140A is adapted to receive a number of primary lines 102 from the splitter circuitry 190 of the I/O cards 250. In exemplary arrangements, each line card 140A receives primary lines 102 for 16 telecommunication lines, which may be implemented as 16 TX and 16 RX differential line pairs. Using line interface circuitry 142, the line interface card 140A transfers telecommunication signals between the communications controller 120 and the associated telecommunication lines via the primary line connections. Depending upon the logical and electrical characteristics of the signaling scheme implemented for the external telecommunication lines, the line interface 142 may provide differential-to single-ended signal conversion, level shifting, and buffering functions.

The communications and control interface 144 may communicate directly with the communications controller 120, or may communicate in a multiplexed fashion using the signaling or connections between the line interface 142 and the communications controller 120. The communications controller 120 monitors communications information or communications signal characteristics for the line interface card 140A in order to detect possible failure states of the line card 140A.

When the communications controller detects a failure state in one of the primary line cards 140A, it communicates with the spare line card 140B. In response, the spare line card 140B uses its switch control interface 146 to communicate with the selection control card 180. In turn, the selection control card 180 causes the desired group of switches 160 on one of the sparing switch cards 230 to connect their associated secondary lines 104 with the sparing bus 106. This scheme may be easily adapted to include alternate command and control interconnections. In some embodiments, the selection control card 180 may receive communications directly from the communications controller 120.

Figure 9:
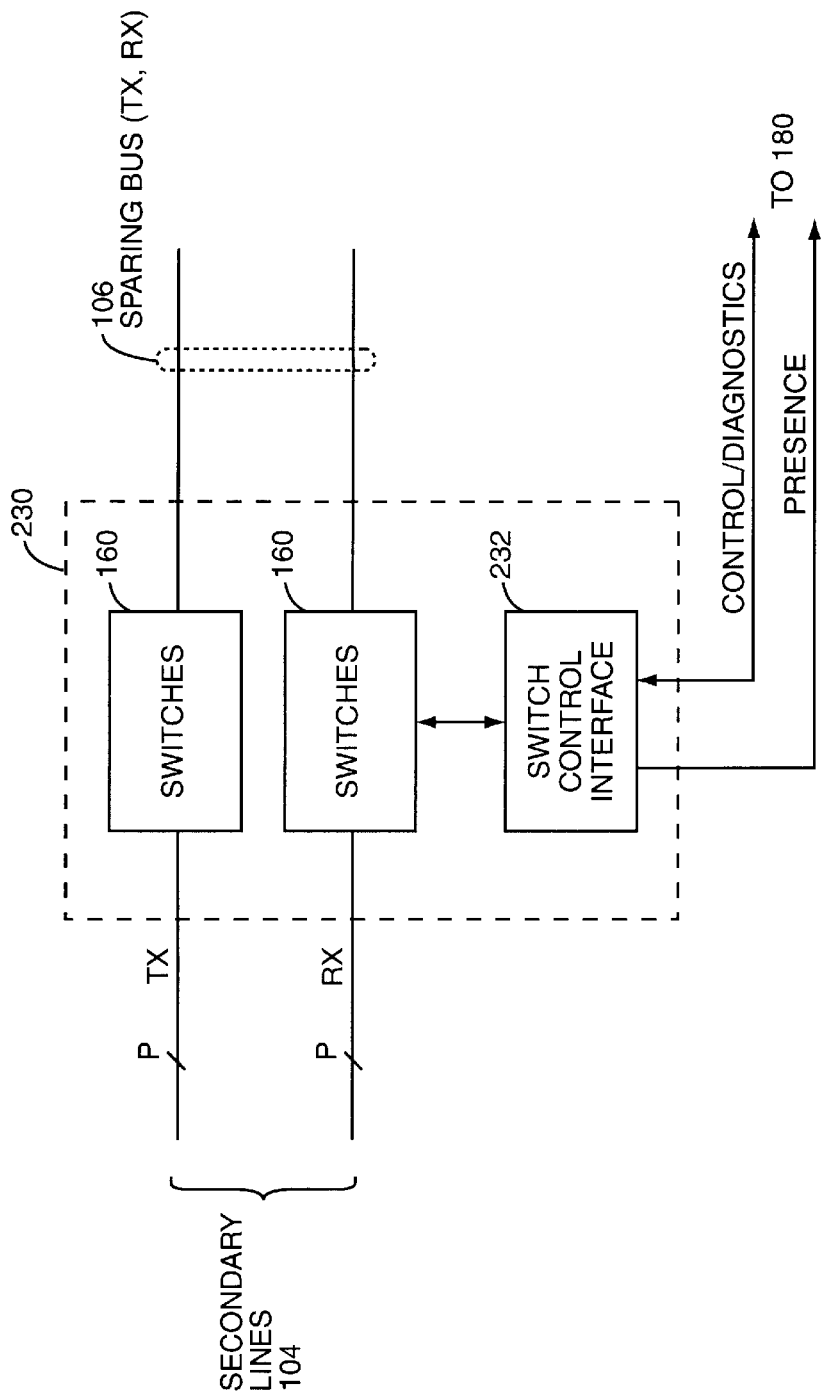
FIG. 9 illustrates an exemplary embodiment for a sparing switch card adapted for the sparing technique of the present invention.

FIG. 9 illustrates an exemplary sparing switch card 230. The sparing switch card 230 preferably includes physical connections adapted to receive a group of secondary TX and RX lines 104 from the backplane 200, a group of switches 160 selectively connecting secondary lines 104 with the sparing bus 106, and switch control and interface circuitry 232. Preferably, the switch control and interface circuitry 232 includes a number of driver circuits and monitoring circuits (not shown for clarity). The structure and design of such circuits will depend upon the type of switches used, as will be readily appreciated by those skilled in the art.

Therefore, the switch control and interface circuitry 232 may be used to selectively operate associated switches 160 under control of the selection control card 180. Further, the switch control and interface circuitry 232 may be used to monitor the operation or state of individual switches 160 (i.e., open or closed). Optionally, the switch control and interface circuitry may provide a "presence" indicating output, which may simply be a discrete signal line (e.g., a resistive pull-down line). Such a signal line can provide a cost-effective way for the selection control card 180 to determine the number and location of sparing switch cards 230 installed in the backplane 200. Preferably, the sparing switch cards 230 are physically adapted to plug into the backplane 200 in a removable fashion to aid maintenance and service operations.

Figure 10:
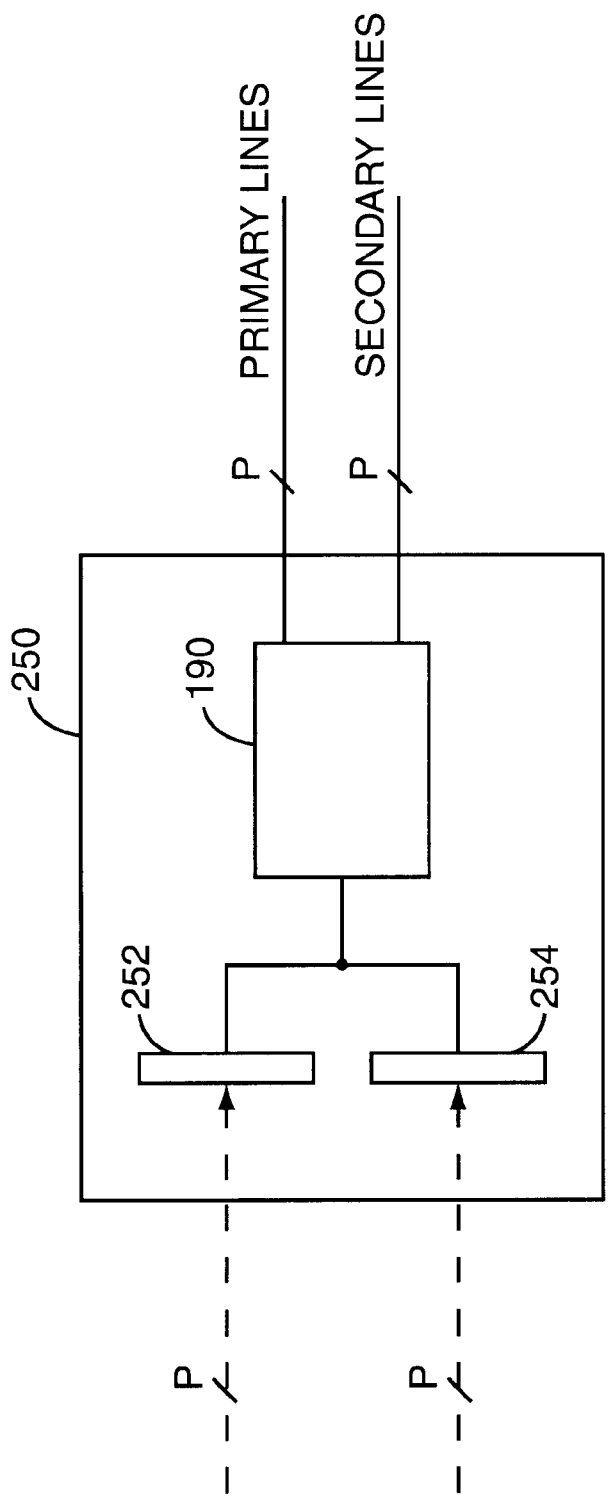
FIG. 10 illustrates an exemplary embodiment for an I/O card adapted for the sparing technique of the present invention.

FIG. 10 illustrates an exemplary I/O card 250, which includes physical interfaces 252 and 254, each adapted to connect with the external telecommunication lines. Preferably, the physical interfaces 252 and 254 provide different connection options and may, for example, comprise a multi-conductor male or female connector, or an array of wiring terminals. Splitter circuits 190 connect with the physical interface 252 and 254 to split each telecommunications line into a primary line 102 and a secondary line 104. As explained above, the splitter circuitry 190 may comprise individual splitter circuits 190 adapted to split the individual conductors in each telecommunications line into a primary and secondary line. This splitting establishes primary and secondary signal paths for the signals carried on each telecommunications line conductor. Primary signal paths are coupled to the primary signal lines 102 to establish the connection between the primary lines 102 and the primary line cards 140A. Secondary signal paths are coupled to the secondary signal lines 104 for connection with the sparing switch cards 230 through the backplane 200.

The present invention allows substantial variation in implementation and circuit organization. For example, circuitry supporting the functionality of the present invention may or may not be organized into individual circuit cards and backplanes. The structure and implementation in the foregoing descriptions are exemplary rather than limiting. Those skilled in the art will readily appreciate that the present invention can be adapted to a broad range of circuit arrangements.

Further, the splitter circuitry 190 may be adapted to the characteristics of specific types of telecommunication lines. While the foregoing description describes an advantageous resistor-based passive network for individual splitter circuits 190 for use with digital subscriber lines, such as DS1 or E1 lines, the splitter circuitry 190 may be implemented in active or passive configurations depending upon the communication signals involved. Additional variation may be found with the configuration of the supporting telecommunications line interface equipment 100, both in its physical configuration and in the number of telecommunication lines supported.

These variations, along with other variations understood by those skilled in the art, are all considered to be within the scope of the present invention. Exemplary embodiments discussed above should not be considered as limiting the scope of the present invention. Indeed, the present invention is limited only by the scope of the claims included herein, and the range of reasonable equivalents thereof.

What is claimed is:

1. A method of using a spare communications circuit in a telecommunications apparatus, said method comprising:

splitting telecommunication lines into primary signal lines coupled to primary communications circuits and secondary signal selective connection to the spare communications circuit;

receiving the secondary signal lines on a backplane; and selectively connecting desired ones of the telecommunication lines to the spare communications circuit via corresponding ones of said secondary signal lines;

wherein said desired ones of the telecommunication lines are connected to the spare communications circuit through corresponding ones of said secondary signal lines when certain primary communications circuits associated with the selected telecommunication lines are not available for service; and wherein the backplane is adapted to be removed without interfering with operation of the primary signal lines and primary communications circuits.

2. The method of claim 1 further comprising selectively connecting a desired group of the telecommunications lines to the spare communications circuit via corresponding ones of said secondary signal lines when performing maintenance on a given one of the primary communications circuits.

3. The method of claim 1 further comprising monitoring the primary communications circuits for malfunctions and selectively connecting an affected group of the telecommunication lines associated with a malfunctioning primary circuit to the spare communications circuit by connecting certain ones of said secondary signal lines corresponding to the affected group of the telecommunication lines to the spare communications circuit.

4. The method of claim 1 further comprising testing selected portions of circuitry associated with selectively connecting said secondary signal lines to the spare communications circuit during normal communications activity of the telecommunications apparatus supported by said primary signal lines and the primary communications circuits.

5. A telecommunications circuit comprising:

splitter circuitry adapted to receive a plurality of telecommunication lines, and to split said telecommunication lines into corresponding primary lines and secondary lines, said primary lines for coupling to primary line interfaces;

a sparing bus for coupling to a spare line interface;

a backplane adapted to receive said secondary lines;

at least one sparing switch connected to said backplane; and selection circuitry carried on said backplane and adapted to control said at least one sparing switch to connect a group of said secondary lines to said sparing bus in response to a selection control signal;

wherein telecommunications signals normally handled by a given primary line interface and routed over ran associated group of primary lines are routed to the spare line interface over a corresponding group of secondary lines via said sparing bus; and wherein said backplane is adapted to permit removal of said backplane without interfering with operation of said primary lines and said primary line interfaces.

6. The telecommunications circuit of claim 5 further comprising a plurality of primary line interfaces, each coupled to a number of said primary lines and adapted to provide an interface between said primary lines and an associated communications controller, and a spare line interface coupled to said sparing bus and adapted to provide an interface between selected ones of said secondary lines and the communications controller.

7. The telecommunications circuit of claim 6 wherein said at least one sparing switch comprises a plurality of sparing switches and associated selection control circuits for selectively connecting respective ones of said secondary lines to said sparing bus in response to a switch selection signal.

8. The telecommunications circuit of claim 7 wherein said selection circuitry further comprises a selection controller adapted to generate said switch selection signal such that desired ones of said secondary lines are connected to said sparing bus via corresponding ones of said sparing switches in response to said selection control signal.

9. The telecommunications circuit of claim 6 wherein said at least one sparing switch comprises a plurality of switch cards each adapted to include a number of sparing switches and an associated selection control circuit, wherein said sparing switches on a given said switch card selectively connect a number of said secondary lines to said sparing bus.

10. The telecommunications circuit of claim 9 further comprising a selection control card adapted to include a selection controller and configured to interface with said backplane to provide a switch selection signal to said plurality of switch cards.

11. The telecommunications circuit of claim 10 wherein said telecommunications circuit is configured such that said primary line interfaces each receive a like numbered group of primary lines and at least one of said plurality of switch cards receive corresponding groups of said secondary lines such that said selection control card can connect any of said corresponding groups of said secondary lines to said spare line interface through one of said switch cards controlled via said switch selection signal, thereby providing said spare line interface as an alternate line interface for any one of said primary line interfaces.

12. The telecommunications circuit of claim 10 wherein said splitter circuitry is adapted to provide said secondary lines such that one or more of said plurality of switch cards, said selection control card, and said spare line interface may be removed without interfering with operation of said primary line interfaces to transfer telecommunication signals on said primary lines.

13. The telecommunications circuit of claim 5 wherein said telecommunications circuit is adapted to interface with a plurality of digital communication lines, and further wherein said splitter circuitry is adapted to present a controlled interface impedance to each of the plurality of digital communication lines.

14. The telecommunications circuit of claim 13 wherein said telecommunications circuit is adapted to receive DS1 telecommunication lines.

15. The telecommunications circuit of claim 13 wherein said telecommunications circuit is adapted to receive E1 telecommunication lines.

16. The telecommunications circuit of claim 5 wherein said splitter circuitry comprises a plurality of splitter circuits corresponding to the plurality of telecommunications lines, and wherein each said splitter circuit comprises a common terminal adapted to receive one of the plurality of telecommunications lines, a primary terminal adapted to provide the corresponding primary line, and a secondary terminal adapted to provide the corresponding secondary line.

17. The telecommunications circuit of claim 16 wherein said splitter circuit comprises a passive network interconnecting said primary and secondary terminals with said common terminal.

18. The telecommunications circuit of claim 17 wherein said passive network is adapted such that a portion of a signal applied to any one of said common, primary, and secondary terminals appears on a remaining two of said common, primary, and secondary terminals.

19. The telecommunications circuit of claim 18 wherein said passive network is a resistor network.

20. The telecommunications circuit of claim 19 wherein said resistor network comprises a first resistor having a first end coupled to said common terminal and a second end coupled to first ends of second and third resistors, and wherein a second end of said second resistor is coupled to said primary terminal and a second end of said third resistor is coupled to said secondary terminal.

21. The telecommunications circuit of claim 20 wherein said passive network is adapted to have an interface impedance defined in accordance with a circuit impedance associated with the telecommunication lines.

22. The telecommunications circuit of claim 21 wherein said plurality of splitter circuits corresponding to the plurality of telecommunication lines comprises one of said splitter circuits adapted to interface with an individual signal conductor in each of the telecommunication lines, and further wherein each telecommunication line comprises one or more signal conductors.

23. The telecommunications circuit of claim 16 wherein said splitter circuit comprises an active network.

24. The telecommunications circuit of claim 23 wherein said active network is adapted to provide a representation of a telecommunication signal presented on said common terminal on each of said primary and secondary terminals.

25. The telecommunications circuit of claim 24 wherein said active network is further adapted to provide a representation of the telecommunication input signal presented on one of said primary and secondary terminals on sad common terminal.

26. A signal line switching card adapted for use in telecommunications line interface equipment that includes splitter circuitry for splitting a number of telecommunication lines into corresponding primary and secondary lines, a sparing bus for coupling a selected group of the secondary signal lines to spare interface circuitry, and selection control circuitry for selecting said selected group of the secondary signal lines, said signal line switching card comprising:

a first set of connections adapted to receive a number of the secondary signal lines derived from said splitter circuitry;

a second set of connections for coupling to said sparing bus;

a plurality of switches adapted to selectively connect respective ones of said first connections with respective ones of said second connections; and a switch control circuit including a control signal input and adapted to control said switches responsive to a control signal received on said switch control signal input from said selection control circuitry; and wherein said signal line switching card is associated with a backplane that is adapted to be removed from the telecommunications line interface equipment without interfering with the primary lines.

27. A switching controller card adapted for use in telecommunications line interface equipment that includes splitter circuitry for splitting a number of telecommunication lines into corresponding primary and secondary lines, a sparing bus for coupling a selected group of the secondary signal lines to spare interface circuitry, and a switching network for selectively connecting a desired group of the secondary signal lines to said sparing bus, said switching controller card comprising:

a first interface adapted to receive switch selection information;

a second interface adapted to output a switch control signal for control of said switching network; and control circuitry comprising a switching controller adapted to generate said switch control signal based on said switch selection information such that said switch control signal operates said switching network to connect said desired group of said secondary signal lines to said sparing bus;

wherein a communications controller included in the telecommunications line interface equipment determines said switch selection information based on monitoring for failure a number of primary interface circuits adapted to transfer communication signal between the telecommunication lines and the primary interface circuits via the primary signal lines; and wherein said switching controller card is mounted on a backplane adapted to be removed without interfering with the primary lines of the telecommunications line interface equipment.

28. A telecommunications apparatus comprising:

a means for splitting a number of telecommunication lines into corresponding primary and secondary lines;

a means for coupling said primary lines to a set of primary communications circuits; and a means for selectively connecting desired ones of said secondary lines to a spare communications circuit when one of said primary communications circuit is unavailable, said desired ones of said secondary lines corresponding to certain ones of said primary lines associated with said unavailable primary communications circuit, said means for selectively connecting associated with a backplane adapted to be removed from the telecommunications apparatus without interfering with the primary lines;

wherein said telecommunications apparatus is operative to provide a communications function for the telecommunication lines using said primary circuits and said primary lines independent of said spare circuit and said secondary lines.

* * * * *